United States Patent [19]

Blatt

[11] Patent Number: 4,828,306

[45] Date of Patent: May 9, 1989

[54] VACUUM CUP CONTROL SYSTEM

[76] Inventor: John A. Blatt, 31915 Groesbeck Hwy., Fraser, Mich. 48026

[21] Appl. No.: 165,154

[22] Filed: Mar. 7, 1988

[51] Int. Cl.4 .......................... B66C 1/02; B25J 15/06; F04F 5/48
[52] U.S. Cl. .................................... 294/64.2; 417/187; 417/191
[58] Field of Search ........................ 294/64.1, 64.2, 65; 269/21; 271/90, 97, 108; 414/121, 627, 737, 744 B, 752; 417/185, 187–191; 901/40; 251/24, 61.1, 212, 335.1, 336, 342

[56] References Cited

U.S. PATENT DOCUMENTS

| | | | |
|---|---|---|---|
| 2,934,086 | 4/1960 | Blatt | 294/64.2 X |
| 3,181,563 | 5/1965 | Giffen | 294/64.2 X |
| 3,219,380 | 11/1965 | Carliss | 294/64.1 |
| 3,349,927 | 10/1967 | Blatt . | |
| 3,372,822 | 3/1968 | Weinert | 294/64.2 X |
| 3,568,959 | 3/1971 | Blatt . | |
| 3,613,904 | 10/1971 | Blatt . | |
| 3,712,415 | 1/1973 | Blatt et al. . | |
| 3,716,307 | 2/1973 | Hansen | 294/64.2 X |
| 4,453,755 | 6/1984 | Blatt et al. . | |
| 4,655,692 | 4/1987 | Ise | 294/64.2 X |

Primary Examiner—Johnny D. Cherry
Attorney, Agent, or Firm—Basile and Hanlon

[57] ABSTRACT

A control system for applying and releasing vacuum in a work-gripping vacuum cup includes a housing having a venturi passage for inducing a vacuum within the cup upon the flow of air through the venturi passage. A one-way check valve in a passage extending through the housing between the venturi and the vacuum cap will seal the vacuum in the cup upon cessation of flow through the venturi passage, thus enabling the cup to grip the workpiece in response to a timed pulse of air through the venturi and to maintain the grip after the air flow is stopped. A second valve controlled passage through the housing enables air under pressure to be injected into the vacuum cup to quickly release its grip on the workpiece.

1 Claim, 2 Drawing Sheets

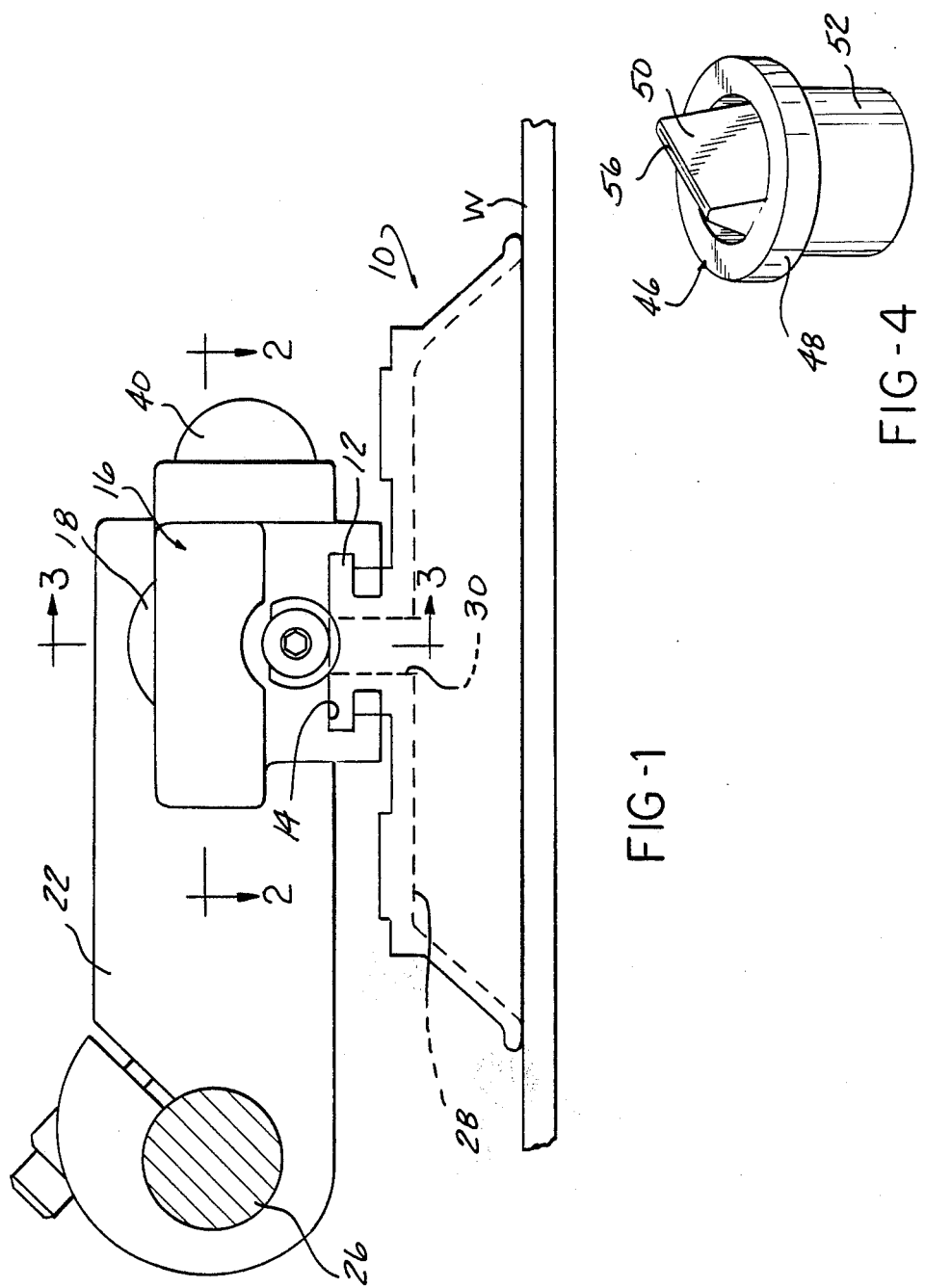

VACUUM CUP CONTROL SYSTEM

BACKGROUND OF THE INVENTION

The present invention relates to a control system for applying and releasing a vacuum from a work-gripping vacuum cup employed as the work-gripping element of a workpiece transporting or locating device. Such devices are widely employed in mass-production environments, typically to load and unload sheet metal parts into and from a die or to carry a part, such as an automobile windshield, to the vehicle to which it is to be installed.

Typical examples of prior art vacuum cup control systems of the type with which the present invention is concerned are found in U.S. Pat. Nos. 3,349,927; 3,568,959; 3,613,904; 3,712,415; and 4,453,755.

The foregoing patents employ a venturi passage which is connected to a source of air under pressure. Flow of air through the venturi passage induces a subatmospheric pressure in the throat of the venturi, and a passage connecting the venturi throat to the interior of the vacuum cup will induce a vacuum within the cup when the cup is applied to a workpiece surface. In the earlier of the patents identified above, it was necesary to maintain the flow of air through the venturi passage in order to maintain the vacuum in the cup because the air withdrawn from the cup flowed into the venturi passage and to the discharge vent at the end of this passage. Upon cessation of the air flow, air at atmospheric pressure was free to flow in the reverse direction through the discharge vent, venturi passage and into the vacuum cup to dissipate the vacuum. Efforts to address this problem involved the addition of structure which substantially increased the profile of the control device. This was a definite disadvantage in those applications where the cup is employed to load and unload a part from a die because the enlarged profile requires a larger die opening to provide clearance for movement of the part-handling device into and out of the die.

A second problem encountered with the earlier devices was that of quickly releasing the vacuum from the cup to release the workpiece at the conclusion of the handling operation. The passage from the discharge vent to the vacuum cup is a relatively restricted passage, and the rate of flow through this passage would diminish substantially as the pressure differential between the negative pressure within the cup and atmospheric pressure approached equalization.

In U.S. Pat. No. 4,453,755, an arrangement for conducting air from the air pressure source to the interior of the vacuum cup to achieve rapid release is disclosed; however, this approach again substantially increases the profile of the control device by the addition of a rather complex valving arrangement to the exterior of the venturi passage housing.

The present invention is directed to a control device for a vacuum cup which is of extremely compact exterior dimensions and which will automatically maintain an induced vacuum in the cup upon cessation of air flow through the venturi passage and which will achieve a rapid release of the vacuum when desired.

SUMMARY OF THE INVENTION

In accordance with the present invention, a control system for controlling the application and release of a vacuum to a workpiece-gripping vacuum cup includes a housing of relatively compact dimensions through which a venturi passage of conventional configuration extends from a venturi passage inlet to a discharge vent which is preferably fitted with a silencer. A branch passage extends through the housing from the venturi throat to a control port located to open into the interior of a vacuum cup mounted on the housing. The venturi passage inlet is connected to a source of air under pressure via a supply conduit fitted with a normally closed on-off valve which is arranged to be opened for timed intervals. When the valve is opened, air under pressure is discharged from the source through the conduit and through the venturi passage, withdrawing air in a wellknown manner from the vacuum cup interior via the branch passage. A one-way check valve in the branch passage accommodates flow through the branch passage in the direction from the control port to the venturi throat but automatically closes to prevent flow through the branch passage in the reverse direction. Flow of air through the venturi passage is for a timed interval sufficient to apply the desired degree of vacuum in the vacuum cup. Upon cessation of the air flow through the venturi passage, the vacuum is held in the cup by closure of the one-way check valve in the branch passage.

To release the vacuum cup from the workpiece, a second passage extends through the housing from a second inlet to the control port. This second inlet is connected by a second conduit and a second on-off valve to the source of air under pressure. This last on-off valve is normally closed and the second passage within the housing is provided with a spring-loaded, one-way ball check valve which seats toward the second inlet. The spring loading of this valve is sufficient to maintain the ball seated in the face of vacuum in the cup but is insufficient to maintain the ball seated when pressure from the source is applied to the second inlet to the housing. When the second inlet is connected to the pressure source, by opening of the valve in the second conduit, air under pressure flows past the ball check valve and through the control port into the vacuum cup to rapidly release the vacuum.

Other objects and features of the invention will become apparent by reference to the following specification and to the drawings.

BRIEF DESCRIPTION OF THE DRAWINGS

FIG. 1 is a side elevational view of a control system embodying the present invention with the air supply system omitted and certain parts broken away or shown in section;

FIG. 4 is a perspective view of a check valve shown in section in FIG. 3.

DESCRIPTION OF THE PREFERRED EMBODIMENT

Figure 2:
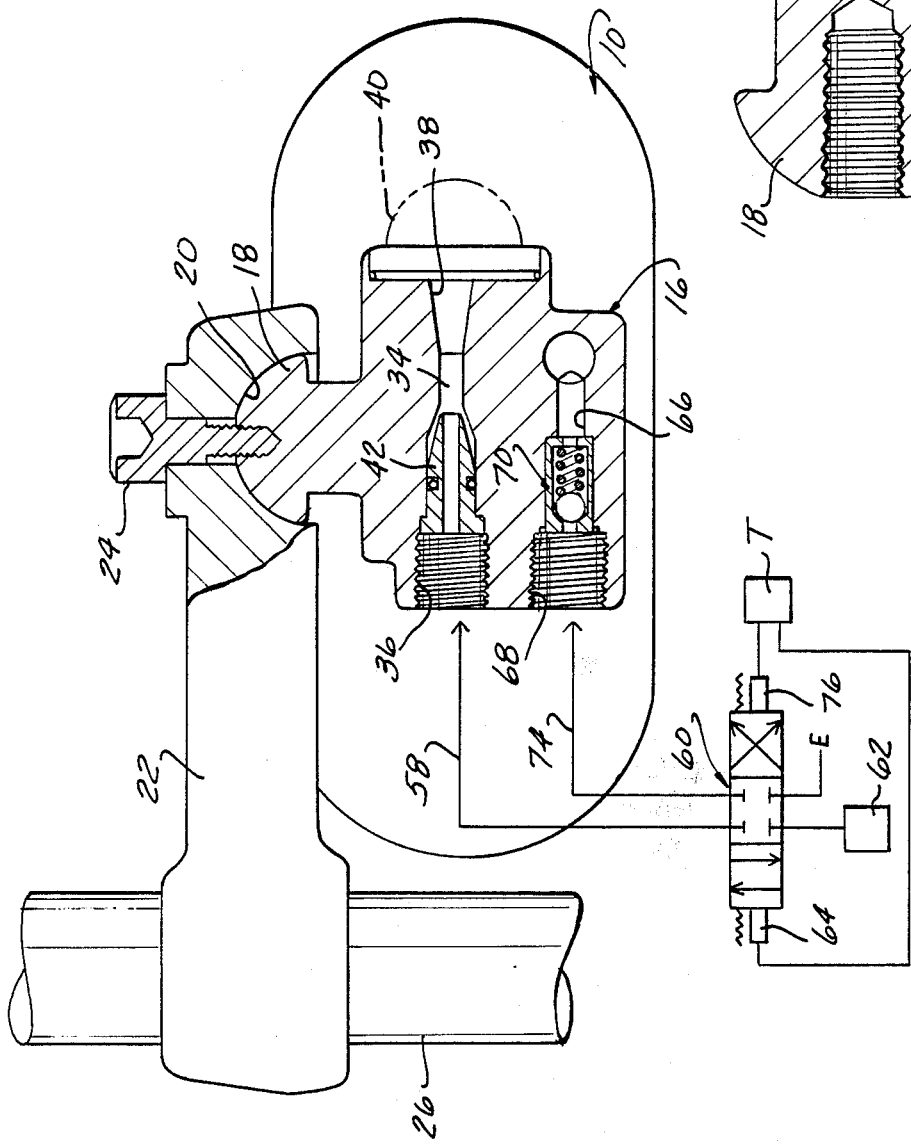
FIG. 2 is a top plan view of the structure shown in FIG. 1, including a schematic diagram of the air supply system, with certain parts broken away or shown in a partial section taken approximately on the line 2—2 of FIG. 1.

Referring first particularly to FIGS. 1 and 2, a vacuum cup designated generally 10 is provided with a fitting 12 at its upper end which is received with a T-slot 14 formed in the bottom of a housing designated generally 16. A generally hemispherical projection 18 formed on housing 16 is received within a recess 20 (FIG. 2) in a bracket arm 22 and clamped within the recess as by a clamping bolt 24. Bracket arm 22 is in turn adjustably clamped upon a rod-like frame member 26 which constitutes part of a movable frame (not shown) employed to mount and move vacuum cup 10 as may be required to move a workpiece W (FIG. 1) from one position to another. Typically, the workpiece will be a sheet metal panel which will be gripped by a group of vacuum cups during the transfer operation. Such transfer devices are well known and do not per se relate directly to the present invention which is specifically concerned with a control system which operates to apply or release a vacuum from the interior of vacuum cup 10.

The interior 28 of vacuum cup 10 communicates at the top of the cup with a vertical passage 30 which extends upwardly through the mounting fixture 12 to open at the top of the fixture. When vacuum cup 10 is mounted within T-slot 14 in housing 16, the upper end of bore 30 communicates directly with the lower end of a control port 32 (FIG. 3) opening through the bottom of housing 16 into T-slot 14.

Referring now particularly to FIG. 2, a venturi passage 34 extends through housing 16 from an inlet 36 at one end of the housing to a discharge opening 38 at the opposite end of the housing. A silencer 40 may be mounted at the discharge end of the housing.

Venturi passage 34 is of a conventional, well-known configuration and a nozzle 42 is mounted within the passage. As is well known, flow of air through passage 34 from left to right will induce a subatmospheric pressure in the region of the throat or small diameter section of the venturi. This region of reduced pressure is employed to induce a vacuum within the interior of vacuum cup 10 by the provision of a passage 44 (FIG. 3) which extends from the region of reduced pressure in the venturi passage 34 to control port 32 which, as explained above, opens into the interior of vacuum cup 10.

A one-way check valve designated generally 46 is mounted within passage 44 and oriented to permit flow from control port 32 to venturi passage 34 when the pressure at control port 32 exceeds the pressure in passage 34. When air is flowing through venturi passage 34, a subatmospheric pressure will be induced in the upper end of passage 44 and air will flow from the interior of vacuum cup 10 upwardly into control port 32, through valve 46 and upwardly into venturi passage 34 until the pressure within the interior of vacuum cup 10 is equalized with that existing in the subatmospheric pressure region of venturi passage 34.

Check valve 46 is of a one-piece molded construction of rubber or a resilient synthetic material formed into a configuration best shown in FIG. 4. The exterior of valve 46 is formed with a disk-like mounting or locating flange 48 from which upwardly protrudes a wedge-shaped outlet section 50. A cylindrical inlet portion 52 projects downwardly from the underside of flange 48.

Figure 3:
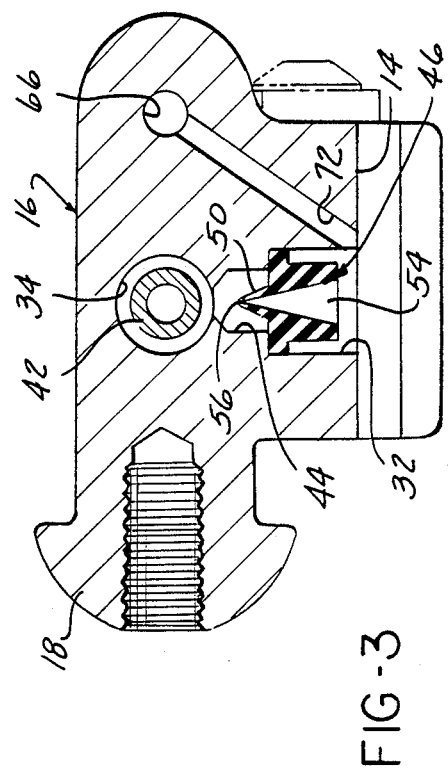
FIG. 3 is a cross-sectional view of the housing shown in FIG. 1, taken approximately on the line 3—3 of FIG. 1.

As best seen in the cross-sectional view of FIG. 3, a passage 54 extends upwardly through the inlet 52 and wedge 50 portions of valve 46 and a slit 56 through the upper edge of wedge portion 50 defines an outlet at the upper end of passage 54. This slit 56 is normally closed. When the pressure within passage 54 of valve 46 exceeds the pressure acting on the exterior of wedge portion 50, the walls of wedge portion 50 will flex outwardly to open slit 56 to permit air to flow upwardly from passage 54 through the opened slits. If, however, the pressure acting on the exterior of wedge portion 50 exceeds that within the interior of the wedge portion, then the slit 54 will be closed to prevent flow of air through the slit. As mounted in housing 16, valve 46 thus acts as a one-way check valve which will permit air to flow from control port 32 to venturi passage 34. to evacuate vacuum cup 10 but will block the flow of air from passage 34 to control port 32 whenever the pressure at control port 32 is less than that in venturi passage 34 Once a vacuum is established within vacuum cup 10, valve 46 will lock this vacuum in place, even if the flow of air through venturi passage 34 is stopped and pressure within passage 34 returns to atmospheric pressure.

Referring now to FIG. 2, to establish an air flow through venturi passage 34, a supply conduit 58 is sealingly connected to inlet 36 and extends from inlet 36 to one control port of a solenoid-actuated, four-way reversing valve 60. A pressure source 62 is connected to an inlet port of valve 60. Valve 60 is normally centered as shown as by centering springs. Upon energization of solenoid 64, the valve shifts to the right to establish a direct connection between source 62 and conduit 58 and air flows from source 62 through conduit 58 into venturi passage 34. If at this time vacuum cup 10 is seated upon a workpiece W (FIG. 1), the flow of air through venturi passage 34 will induce a vacuum within cup 10 causing the cup to firmly grip workpiece W.

Preferably, valve 60 is actuated by a timer control T to open for a period of time sufficient to enable the resultant air flow through venturi passage 34 to induce a sufficient vacuum within vacuum cup 10 to achieve the desired grip upon workpiece W. As explained above, once this vacuum is induced, the operation of check valve 46 will maintain the vacuum within cup 10 upon the subsequent closing of valve 60 at the end of the timed interval with the resultant cessation of air flow through venturi passage 34.

In order to release the vacuum within vacuum cup 10, a second passage 66 extends into housing 16 from an inlet 68. A one-way, spring-loaded ball check valve designated generally 70 is located within passage 66 and oriented to seat toward inlet 68; that is, valve 70 will accommodate flow from inlet 68 into passage 66 but will block flow from passage 66 into inlet 68.

Referring now to FIG. 3, it is seen that passage 66 communicates with control port 32 via an inclined passage 72 through housing 16.

When a vacuum exists within cup 10, and thence at control port 32, the consequent reduced pressure in passage 66 is insufficient to overcome the biasing of the spring of the one-way check valve 70; and thus this valve will remain closed so that vacuum does not leak from cup 10.

When it is desired to release the vacuum from vacuum cup 10, solenoid 76 of valve 60 is actuated to connect pressure source 62 to conduit 74. The pressure supplied by source 62 is more than adequate to open check valve 70, and air under pressure from source 62 flows past the check valve and via conduit 72 (FIG. 3) into the control port 32 to quickly raise the pressure within the interior of vacuum cup 10 to atmospheric pressure, thus releasing the grip of vacuum cup 10 on the workpiece.

Valve 76 may be operated, if desired, with a timer control in the same fashion as valve 60; however, in most applications a manually initiated momentary opening of valve 76 is sufficient to release or dissipate the vacuum in the interior of cup 10.

While one embodiment of the invention has been described in detail, it will be apparent to those skilled in the art the disclosed embodiment may be modified. Therefore, the foregoing description is to be considered exemplary, rather than limiting, and the true scope of the invention is that defined in the following claims.

What is claimed is:

1. A vacuum cup venturi control system for applying and releasing a vacuum to a workpiece engaging vacuum cup, said system including a source of air under pressure, an elongate one-piece housing having a first flow passage means extending longitudinally therethrough from a first inlet to an outlet vented to atmosphere, venturi means including a throat section in said first passage means for producing a subatmospheric pressure in said throat section upon the flow of air through said first passage means from said first inlet to said outlet, a control port in said housing opening at one side of said housing in constant fluid communication with said vacuum cup, second flow passage means in said housing extending traversely of said housing from said control port to communicate with said throat section, a one-piece valve member of resilient material seated in said second passage means and having a wedge-shaped outlet section having convergent opposed outer side surfaces projecting from one end of said member to an upper edge adjacent said throat section, an internal flow passage extending through said member from its other end into said wedge-shaped outlet section to a slit opening through said upper edge of said outlet section, said slit being normally closed when the pressure acting on said outer side surfaces equals or exceeds the pressure in said internal passage and being movable to an open position to accommodate flow from said control port into said throat section when the pressure in said internal passage exceeds that acting on said side surfaces, and valve controlled conduit means connected between said source and said control port via third flow passage means in said housing operable to supply a vacuum releasing charge of air under pressure from said source to said vacuum cup.

* * * * *